June 29, 1965   W. J. RAPSON, JR   3,191,427
DETECTION OF CONDUIT LEAKS
Filed June 24, 1963   2 Sheets-Sheet 1
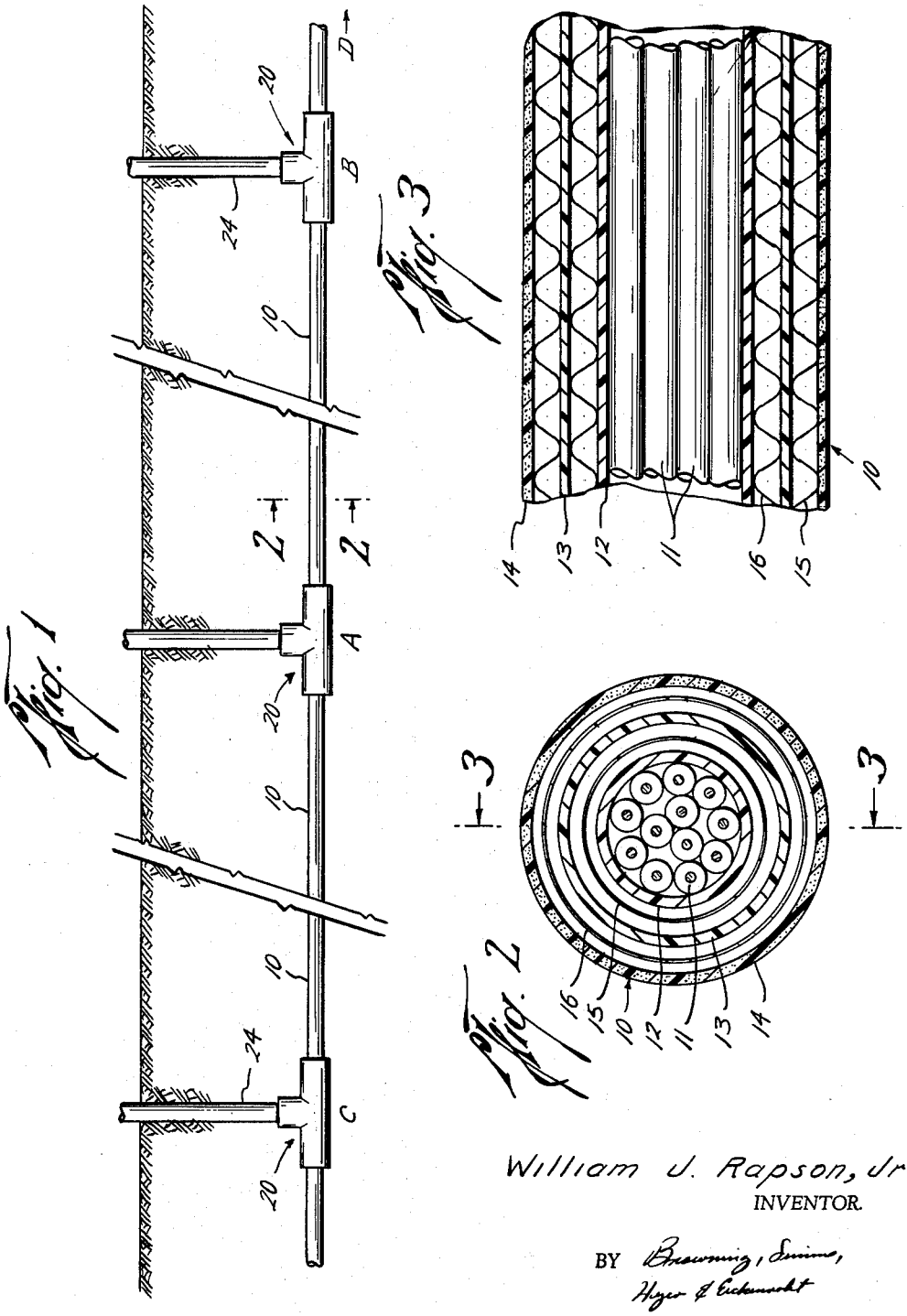
William J. Rapson, Jr.
INVENTOR.
BY
ATTORNEYS William J. Rapson, Jr.
INVENTOR.

United States Patent Office 3,191,427
Patented June 29, 1965

3,191,427
DETECTION OF CONDUIT LEAKS
William J. Rapson, Jr., Houston, Tex., assignor to The Scott Corporation, Houston, Tex., a corporation of Delaware
Filed June 24, 1963, Ser. No. 290,057
10 Claims. (Cl. 73—40.5)

This invention relates to a method and apparatus for locating a leak where the leak establishes communication between two conduits.

There are many types of conduits in service today which contain fluid under pressure and which are located so that a leak in the conduit will establish communications between that conduit and another conduit. Examples of such conduits are multi-sheath communications cables, conduit tile which provides a plurality of parallel conduits enclosed within one large outside conduit, pipeline road and water crossings, insulated piping, oil and gas wells, etc. The multi-sheath communications cables and conduit tile type of conduits carry electrical circuits and are not used to carry fluid from one place to another as does a pipeline. Most of these conduits, however, do contain dry gas under pressure to keep moisture, etc. from leaking into the conduit and shorting out the electrical circuits therein, and therefore these conduits have leakage problems in common with the pipeline.

Leaks which occur in the inner walls of these conduits are very difficult to locate since the escaping fluid can travel up and down the annular space between the inner wall and outer wall of the conduit in both directions, thus giving no indication on the outside of the conduit as to the exact location of the leak. For this and other reasons, it is highly desirable to have a method whereby a leak in the inner wall of a conduit, such as the types described above, can be located accurately, quickly and economically so that the leak can be repaired with a minimum amount of lost time, and it is an object of this invention to provide such a method.

It is also an object of this invention to provide a method of locating a leak in a conduit where the leak establishes communication between two conduits which does not require the conduit to be excavated or exposed in any manner for visual inspection.

It is also an object of this invention to provide a method for locating a leak in a conduit which establishes communication between two conduits which does not require taking the conduit out of service during the time the leak is being located.

It is a further object of this invention to provide apparatus for locating a leak in a conduit which establishes communication between two conduits, the apparatus being arranged whereby the leak can be located without disturbing the conduit or having to remove it from service.

Other objects, features and advantages of this invention will be apparent to those skilled in the art from the consideration of the specification, attached drawings and appended claims.

To locate a leak which establishes communication between two conduits in accordance with this invention, circulation is established through one of the conduits between two points which are spaced a known distance apart. Two quantities of time are then determined, one being the length of time necessary for a marker of detectable material to travel between the two points which are a known distance apart, $T_t$, and the time required for a marker of detectable material to travel from the leak to one of the known points, $T_1$. Then by multiplying the distance between the two points by the ratio of the times measured, $T_1/T_t$, the distance from the leak to the points will be determined.

As explained above there are many types of conduits where this method of leak location can be used. Further, the method is applicable whether the leak allows pressure to escape from the conduit or to enter the conduit as would be the case where the pressure in the conduit was less than the ambient pressure as in a vacuum system. For purposes of illustration the method will be described in detail below in connection with a multi-sheath communications cable which normally comprises at least two concentric conduits. These communications cables are commonly buried beneath the surface of the ground, and it is, of course, very desirable to be able to locate a leak in their inner walls without having to excavate and expose long sections of the cable to do so.

In the drawings:

FIG. 1 illustrates schematically three sections of a typical multi-sheath communications cable joined together with connectors and buried beneath the surface of the ground;

FIG. 2 is a cross-sectional view through a typical multi-sheath communcations cable showing how the sheaths which make up the cable form a plurality of conduits located one within the other;

FIG. 3 is a longitudinal sectional view taken along line 3—3 of FIG. 2;

Figure 4:
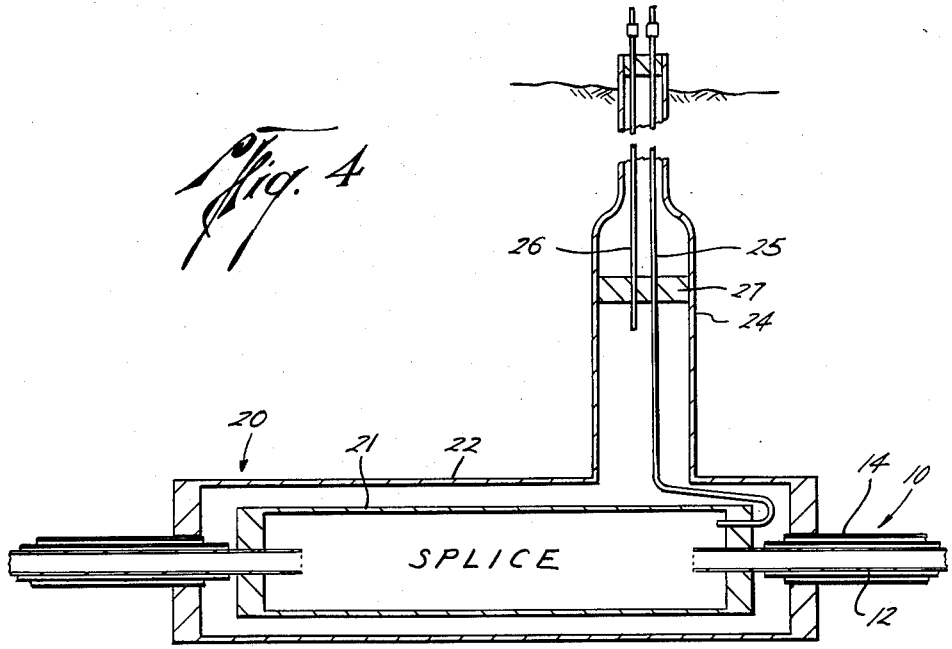
FIG. 4 is a longitudinal cross-sectional view through a connector which can be used to splice two sections of the cable together and which also provides apparatus for practicing the method of this invention.

The multi-sheath communications cable, indicated generally by the number 10 in the drawings and shown in cross-section in FIGS. 2 and 3, consists of an inner bundle of individual communication circuits or pairs 11. Multi-sheath communications cables commonly consist of three sheaths like the one illustrated which has an inner sheath 12 located within a next larger sheath 13 which in turn is located within an outer sheath 14. All of these sheaths combine to provide conduits, that is inner sheath 12 provides a conduit for the electrical circuits which run therethrough and also for the dry air which is maintained under pressure therein, whereas the next outer sheath 13 provides a conduit for inner sheath 12 and outer sheath provides the conduit for sheaths 12 and 13.

Located between the sheaths are corrugated metal tubes 15 and 16. These metal tubes provide electrical shield for the circuits within the inner conduit of the cable, and also give it sufficient strength to withstand the overburden when the cable is buried. In the construction of these cables each individual conductor is either wrapped in paper or a plastic such as polyethylene depending on the service to which the cable is to be subjected. The conduits or sheaths are preferably made from a flexible non-conductive inert material or lead alloys that have sufficient strength to maintain an internal pressure and to withstand the normal use to which these cables are subjected. Here, again, polyethylene is one such material which is commonly used for these conduits or sheaths.

Multi-sheath cable comes in various lengths depending upon its size, but usually many sections of cable are required to make up a communications line. These sections must be connected in some manner and this is normally done by means of a connector such as the one shown in FIG. 4.

As will be understood from the description set out below, this invention can be used to locate leaks in the cables before they are connected into the system. In fact by using the method of this invention the cables can be pressure tested, and if a leak is found, it can be located while the cable is still coiled on its shipping drum.

As shown in FIG. 4 the connector generally indicated by the number 20 has inner splice case 21 and outer splice case 22. The inner splice case connects inner conduit 12 of one section of cable to the inner conduit of the other section of cable. The outer splice case in turn connects the outer conduit of one section to the outer conduit of the other. As explained above, a dry gaseous atmosphere having a pressure of from about four to 15 p.s.i. is maintained within the inner conduit to make sure that ground water, moist air, etc. do not enter the inner conduit and harm the electrical circuits therein, should the inner conduit leak. Air, nitrogen and sulfur hexaflouride are fluids which are commonly used for this purpose. In each case, of course, the gas is dried as completely as possible before introducing it into the inner conduit.

The gas is usually introduced into the inner conduit through a connector such as the one illustrated in FIG. 4. As shown a riser 24 is connected to outer splice case 22 and extends up to or above the surface of the ground. Tube 25 extends from the surface through the riser to the connector and is connected into inner splice case 21 to provide a connection from the surface to the inner conduit through which the dry gas can be supplied. Since the inner conduit is usually filled with electrical conductors, the dry gas cannot readily flow through the conduit. For this reason, it is common practice to provide a connection from the surface to the inner conduit at many points along the cable to reduce the distance the gas is required to flow through the conduit. These connections also provide convenient places for measuring the pressure in the conduit. Stopper 27 is provided to keep surface water from leaking into the riser and entering the connector.

In the practice of this invention it is necessary to have fluid communication with both of the conduits which the leak connects. In the case of the buried communications cable illustrated in the drawings, a leak in the inner conduit will connect it to the outer conduit. Therefore, some means must be provided to allow fluid communications between the outer conduit and the surface of the ground. In the embodiment illustrated this is done by means of tube 26 which extends from the surface to the annulus between the inner splice case and the outer splice case of connector 20. Of course, it may not be necessary to have a fluid connection from the surface to either the annular space between the conduits or the inner conduit at each connection point. Where this is true, connectors without risers can be used.

When a leak occurs in the inner conduit of a communications cable such as the one illustrated in the drawings, pressure gauges or pressure sensitive transducers or various other means are provided to detect such leaks and signal that the pressure in the inner conduit is reduced. A pressure sensitive device is usually located at each injection point along the cable and usually the leak can be located between two injection points by observing the effect the leak has on the pressure devices.

As explained above, to locate the position of a leak in accordance with this invention, the time required for a traceable material to travel from one point to another is measured and compared with the time it takes a traceable material to travel from the leak to one of the reference points. The ratio of these two quantities of time then indicates the location of the leak with respect to the two reference points. Therefore, if the connectors between which the leak is located are provided with a tube connecting the surface with the annular space between the conduits, then the two connectors can serve as the reference points. If a fluid connection from the surface to the annular space has not been previously provided, then one will have to be made at two selected points before the leak can be located. In the practice of this invention circulation must be established between the reference points through at least one of the conduits. The invention will first be described where the circulation is through the outer conduit.

Preferably, the reference points are located on opposite sides of the leak; however, if the proper conditions exist this will not be absolutely necessary to the practice of the invention, since the leak is located by a comparison of two times and since the time measured indicates a rate of flow which is usually the same in all parts of the conduit and which should not be affected appreciably whether the flow is past the leak or not.

Assume for purposes of illustration the leak is located between connectors A and B of FIG. 1 each of which have means, such as tubes 25 and 26 as shown in FIG. 4 connecting the inner conduit and the annular space between the inner and outer conduits to the surface. To obtain the time that it takes a traceable material to travel from one connector to the other a flow of gas is established between the two connectors through the annular space between inner sheath or conduit 12 and outer conduit 14. In the case of the cable illustrated there are actually two annular spaces between the inner and outer conduits. Usually, no attempt is made to isolate any one of the annular spaces from the other which would have to be done at the connector. Also, usually, these conduits are not spaced apart as uniformly as they appear to be in the drawing, the outer annular space being normally the larger in cross-sectional area. This doesn't affect the practice of the invention, however, since fluid will flow through all of the annular areas between the inner and outer conduits to some extent which is all that is necessary.

Gas should be circulated long enough to remove most of the tracer material which has leaked into the annular space from the leak. Also preferably, the pressure of the gas being circulated should be slightly greater than the pressure in the inner conduit. This circulation of gas and its pressure relative to the inner conduit, are particularly important initial steps where the gas in the cable contains a pre-mixed tracer material which if not removed from the annulus could cause an erroneous reading of time to be obtained.

Gas then is circulated down the tube at connector A and out the tube at connector B until a flow rate is established and the annular space is purged. Next a detector device (not shown) is located at connector B to sample the gas flowing out of tube 26 and a marker of traceable material is injected into the circulating gas at connector A. The time it takes this marker of traceable material to travel through the annular space from connector A, to the detecting device at connector B is then measured. Nitrous oxide is a commonly used traceable material which is easily detectable by infrared analyzer detecting apparatus.

The rate at which the gas is circulated during the time the marker is traveling between the connectors should be known so that this rate can be compared to the rate used when measuring the length of time the traceable material is traveling from the leak to the detector which is the next step in determining the location of the leak.

The circulation of gas through the annulus is continued long enough to purge the annular space of most of the previously injected traceable material. Next a marker of traceable material is located in the inner conduit adjacent the leak. It may be that a traceable material was premixed with the gas in the inner conduit and it would be already in position. This is usually not the case, however, so usually a marker of traceable material must be introduced into the inner conduit of the cable through an appropriate connector such as the one illustrated in FIG. 4, which has tube 25 connecting the inner conduit to the surface of the ground. A connector so equipped may be several joints away from the two connectors between which the leak is located so sufficient time must be allowed for this traceable material to reach the leak before taking the next step in locating the leak.

With the marker of traceable material in position adjacent the leak in the inner conduit, the circulation of gas through the annular space between the conduits is either stopped long enough for a detectable amount of the traceable material to leak through the wall of the inner conduit into the annular space or the pressure in the inner conduit increased sufficiently to force the traceable material through the leak. Circulation is then resumed or continued as the case may be, and the time required for the marker of traceable material which passed through the leak to travel from the leak to the detector at connection B is measured.

Preferably the rate at which gas is circulated while measuring this time is the same as it was when obtaining the time for the marker to travel between the two connectors. This is not absolutely necessary, however, but if the rates of flow are different, this should be taken into account when calculating the location of the leak. If the rate of circulation is the same, then the location of the leak can be determined by multiplying the distance between the connectors A and B by the ratio of the time required for the traceable material to move from the leak to the detector, $T_1$, to the time required for the traceable material to move between the connectors, $T_t$, i.e. $T_1/T_t$. The answer is the distance the leak is from the connector where the detector is located, which in this case was connector B.

Figure 5:
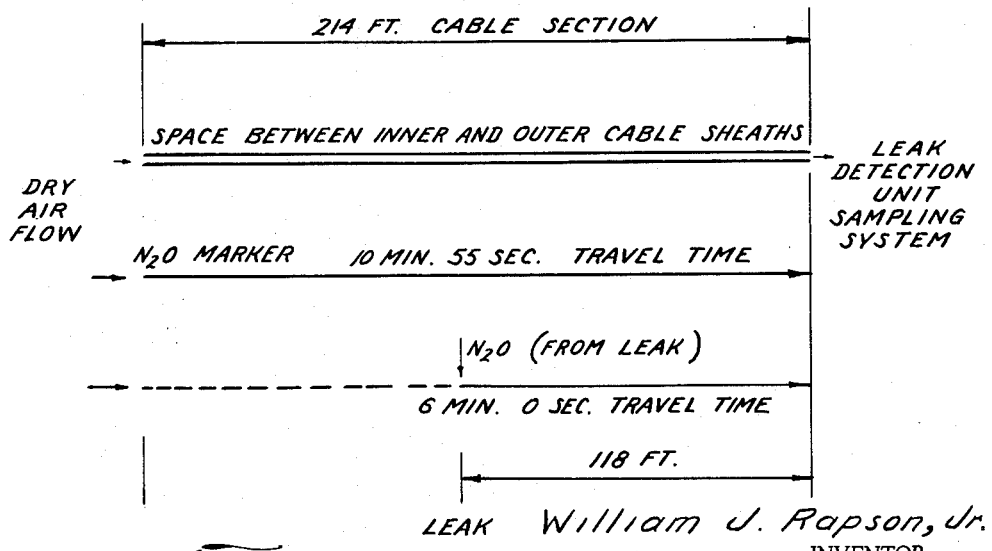
FIG. 5 illustrates graphically how a leak was actually located in the inner conduit of a multi-sheathed communications cable by employing the method and apparatus of this invention.

A typical example of a practical application of the method of this invention is shown in FIG. 5. In this particular instance a leak developed in the inner conduit of a cable section between connectors which were 214 feet apart. Dry air was circulated in the space between the inner and outer conduits until the annular area between these two conduits was purged of any possible detectable material. A nitrous oxide marker was then inserted in the circulating air and the time required for it to travel to the detector was measured. In this particular case it required ten minutes and 55 seconds for the nitrous oxide marker to travel from one connector through the outer conduit to the detector located at the other connector. Nitrous oxide was then inserted in the inner conduit of the cable, circulation was maintained in the outer conduit to keep this area purged of any nitrous oxide which may have leaked into it previously, then after sufficient time had passed for the nitrous oxide to reach the leak, the circulation of gas in the outer conduit was stopped long enough for a detectable amount of nitrous oxide to travel through the leak into the outer conduit. Circulation was then resumed in the outer conduit at the same rate as it was previously maintained and the time required for the nitrous oxide to reach the detector was measured. Here, it took six minutes for the nitrous oxide to reach the detector. Thus the leak was determined to be 118 feet from the connector where the detector was located simply by multiplying 214 by the ratio of 6 over 10 minutes and 55 seconds. The cable was excavated at this point and the leak repaired in a minimum of down time.

In both of the above descriptions of practicing the method of this invention it was the annular space between the inner and outer conduits through which the marker of traceable material was pumped and timed. This method could be performed equally as well by reversing the procedure. In many cases the annular space between the conduits is such that it will be very difficult to establish any substantial rate of flow of gas therethrough, whereas gas can freely flow through the inner conduit. In situations like these the method of the invention can be modified so that the marker of traceable material is measured as it moves through the inner conduit between the two connectors and between the leak and one of the connectors.

In other words, assuming as in the case described above, the leak in the inner conduit is located between connectors A and B of the multi-sheath cable 10 as shown in FIG. 1. Assume further that the connector at A and B are the type illustrated in FIG. 4 so that there is a connection from the surface to the inner conduit at both points, then circulation of gas can be established between connector A and connector B through the inner conduit. A detector is located at connector B as before and a marker of detectable material is pumped from connector A to connector B and the time recorded. The next step is to have a marker of detectable material enter the inner conduit through the leak therein. This can usually be done even though the rate of flow through the annular area between the inner and outer conduits is extremely low because very little nitrous oxide is required to establish a marker. Therefore, a marker such as nitrous oxide is forced into the annular space between the conduits through some means such as line 26 shown in FIG. 4. Circulation through the inner conduit, of course, is either stopped long enough for this nitrous oxide to enter the inner conduit through the leak in a sufficient quantity to be detected or the pressure in the annulus is raised sufficiently to accomplish the same result. Circulation is then resumed through the inner conduit and the time recorded for the marker to reach the detector. This produces the same ratio of times as before which when multiplied by the distance between the connectors will give the distance the leak is from the connector where the detector is located.

In many cases conduits such as the multiple sheath cables illustrated in the drawings are part of an overall network of cables which are interconnected in such a way that it may be very difficult to maintain or to be sure that fluid circulating between two points on the cable will always travel in the proper direction. In other words, when introducing gas through connector A into the inner conduit in the manner described above it is possible that the fluid introduced would flow in both directions rather than all going in the direction desired, that is toward the connector B. Also, the amount that goes in one direction or the other may vary and cause fluctuations in the rate of flow between A and B, thus causing the time measured for the marker to move from A to B to fluctuate.

To overcome this problem a source of pressure is connected to either the annular space between the conduits or the inner conduit depending upon which version of the method is to be employed. Then by carefully regulating the pressure so that the pressure at C will equal the pressure of the gas being circulated at A there will be no pressure drop between A and C and no gas will flow from A toward C. Thus all the gas injected at A will flow toward B and the flow rate, once established, will be constant. This does not mean that no gas will flow on past B down the line or that no gas will flow toward B from the other direction and out the outlet at B. However, this is not important since this will not change the measured rate of flow of gas from A to B.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of determining the location of a leak in a conduit where the leak establishes communication with another conduit comprising, measuring the time required for a first marker to travel through one of the conduits between two points spaced a known distance apart, injecting a second marker through the leak into the same conduit through which the first marker traveled, and measuring the time for the second marker to reach one of the spaced points.

2. A method of determining the location of a leak in one of the inner walls of a multi-walled conduit having two passageways between which the leak is located comprising, measuring the time required for a fluid marker to travel through one of the passageways between two points on the conduit, located a known distance apart; measuring the time required for a fluid marker to travel through the same passageway from the leak to one of the aforesaid points, adjusting the times measured for any difference in the speed that the markers were pumped through the passageway; and multiplying the distance between the two spaced points by the ratio of the second time to the first time.

3. A method of locating a leak in a conduit where the leak establishes communication with another conduit comprising, introducing a marker of tracer material into one of the conduits at a first point, injecting fluid into the conduit to force the marker to travel down the conduit past the leak; measuring the time required to pump the marker to a second point located on the opposite side of the leak from the first point and a known distance from the first point, injecting a second marker of detectable material into the conduit from the other conduit through the leak; and measuring the time required to pump the second marker to one of the points.

4. A method of locating a leak in the inner wall of a multiple-walled conduit comprising, introducing a marker of tracer material in the annular space adjacent the inner wall with the leak at a first point on one side of the leak; injecting fluid into the annular space to force the marker to travel longitudinally down the annular space past the leak; measuring the time required for the marker to travel from the first point to a second point a known distance from the first point where the marker was introduced, injecting a second marker of tracer material through the leak being located into the annular space; injecting fluid into the annular space to force the second marker to travel toward one of the points; and measuring the time required for the second marker of tracer material to travel to one of the points.

5. The method of claim 4 in which the second marker is injected through the leak into the annular space by locating the tracer material on the opposite side of the leak from the annular space and stopping the flow of fluid through the annular space long enough for a sufficient amount of the detectable material to pass through the leak into the annular space to provide a marker.

6. The method of claim 4 in which the second marker is injected through the leak into the annular space by locating the tracer material on the opposite side of the leak from the annular space and increasing the pressure of the traceable material sufficiently to cause it to flow through the leak into the annular space.

7. A method of locating a leak in a conduit where the leak establishes communication with a second conduit comprising, introducing a marker of tracer material into the conduit at a first point on one side of the leak; injecting fluid into the conduit to force the marker to travel down the conduit past the leak to a second point a known distance away from the first point; measuring the time required for the marker to travel from the first to the second point; introducing a second marker of detectable material from the second conduit through the leak into the conduit; injecting fluid into the conduit to force the second marker to travel through the conduit toward one of the points; and measuring the time required for the second marker to travel from the leak to one of the points to determine what proportion of the distance between the points is the distance from the leak to the points.

8. The method of claim 7 in which the second marker is introduced into the conduit by locating a quantity of traceable material in the second conduit adjacent the leak, and stopping the flow of fluid in the conduit long enough for a sufficient amount of the traceable material to flow through the leak into the conduit to provide a marker.

9. The method of claim 7 in which the second marker is introduced into the conduit by locating a quantity of traceable material in the second conduit adjacent the leak and increasing the pressure in the second conduit sufficiently to cause enough material to flow through the leak into the conduit to form a marker.

10. A method of locating a leak in a conduit where the leak establishes communication between the conduit and a second conduit said method comprising the steps of connecting a source of fluid pressure to first, second and third points on one of the conduits; the second and third points being adjacent and located a known distance apart and on opposite sides of the leak, with the first point adjacent the second point; maintaining the pressure in the conduit at the first and second points equal; establishing a rate of flow of fluid through the conduit from the second point past the leak to the third point; introducing a marker of traceable material into the flowing fluid and measuring the time required for the marker to travel from the second to the first point; introducing a second marker into the conduit through the leak and measuring the time required for the flowing fluid in the conduit to carry it to the third point, and multiplying the distance between the second and third points by the ratio of the second time measured to the first time measured to determine the distance from the third point to the leak.

References Cited by the Examiner

UNITED STATES PATENTS

| | | | |
|---|---|---|---|
| 2,043,033 | 6/36 | Capdeville | 174—93 |
| 2,406,676 | 8/46 | Gambitta | 174—21 |
| 2,427,627 | 9/47 | Shiroyan | 73—40.5 X |
| 2,983,506 | 5/61 | Bertsch et al. | 285—133 |

FOREIGN PATENTS 734,298   7/55   Great Britain.

ISAAC LISANN, *Primary Examiner.*

ROBERT L. EVANS, *Examiner.*